(12) United States Patent
Murugesan et al.

(10) Patent No.: US 10,736,247 B2
(45) Date of Patent: Aug. 4, 2020

(54) SYSTEM AND METHOD WITH OPTIMIZED POLYMER AND METAL STRUCTURAL COMPONENTS FOR ELECTRONIC ASSEMBLY

(71) Applicant: HONEYWELL INTERNATIONAL INC., Morris Plains, NJ (US)

(72) Inventors: Gokul Murugesan, Karnataka (IN); Santosh Kustagi, Karnataka (IN); Raghuveer Hanumanthrao Desai, Karnataka (IN); V Valiveti, Andhra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/212,230

(22) Filed: Dec. 6, 2018

(65) Prior Publication Data
US 2020/0187394 A1    Jun. 11, 2020

(51) Int. Cl.
*H05K 9/00* (2006.01)
*H05K 5/00* (2006.01)
(Continued)

(52) U.S. Cl.
CPC ......... *H05K 9/0049* (2013.01); *G06F 30/23* (2020.01); *G06F 30/39* (2020.01); *H05K 5/006* (2013.01);
(Continued)

(58) Field of Classification Search
CPC .. H05K 7/20436; H05K 5/006; H05K 5/0056; H05K 5/03; H05K 9/0049; G06F 17/5068; G06F 17/5018
See application file for complete search history.

(56) References Cited

U.S. PATENT DOCUMENTS 7,326,862 B2   2/2008   Lionetta et al.
8,081,466 B2   12/2011  Kaufman et al.
(Continued)

OTHER PUBLICATIONS

Mechanisms of thermoplastics to metal adhesion for applications in electronics manufacture; Loughborough University Institutional Repository; A Doctoral Thesis. Submitted in partial fulfillment of the requirements for the award of Doctor of Philosophy of Loughborough University; Metadata Record: https://dspace.lboro.ac.uk/2134/8531; Publisher: © Hrushikesh Abhyankar.
(Continued)

*Primary Examiner* — Hoa C Nguyen
*Assistant Examiner* — Keith DePew
(74) *Attorney, Agent, or Firm* — Lorenz & Kopf, LLP

(57) ABSTRACT

A system and method of constructing an electronic assembly. A structural component is identified as a candidate for forming as a combined construction of a metal element and a polymer element. A minimum material thickness required of the metal element for achieving a required electromagnetic shielding property is determined. A minimum area required of the metal element for achieving a required electrical bonding property is determined. A maximum polymer element proportion of the structural component that meets a required structural property and a required thermal property is determined. The structural component is designed with the metal element having the minimum material thickness and the minimum area and with the polymer element having the maximum polymer element proportion. The structural component is manufactured from the polymer element and the metal element to meet the mechanical and electrical properties, and the structural component in the electronic assembly.

20 Claims, 10 Drawing Sheets

(51) Int. Cl.
*H05K 5/03* (2006.01)
*H05K 7/20* (2006.01)
*G06F 30/23* (2020.01)
*G06F 30/39* (2020.01)
*G06F 111/20* (2020.01)

(52) U.S. Cl.
CPC ............ *H05K 5/0056* (2013.01); *H05K 5/03* (2013.01); *H05K 7/20436* (2013.01); *G06F 2111/20* (2020.01)

(56) References Cited

U.S. PATENT DOCUMENTS

| | | |
|---|---|---|
| 9,668,388 B2 | 5/2017 | Caclard |
| 2002/0162673 A1 | 11/2002 | Cook et al. |
| 2009/0202761 A1 | 8/2009 | Malek et al. |
| 2012/0237789 A1 | 9/2012 | Wang et al. |

OTHER PUBLICATIONS

James O'Keeffe; Composite Enclosures Combine Light Weight With Shielding Effectiveness; Aerospace, Defense & Marine /// White Paper; 2012.

Plastic/Metal Hybrid Technology; Innovative Design Solutions for Structural Performance with Weight and Cost Reduction; Copyright 2005, LANXESS Corporation.

Peek Polymer Solutions for the Aerospace Industry; © Victrex Polymer Solutions Jul. 2014.

SYSTEM AND METHOD WITH OPTIMIZED POLYMER AND METAL STRUCTURAL COMPONENTS FOR ELECTRONIC ASSEMBLY

TECHNICAL FIELD

Embodiments of the subject matter described herein relate generally to light weight electronic assemblies. More particularly, embodiments of the subject matter relate to systems and methods optimizing the use of a light weight polymers in combination with metal for structural components of an electronic assembly.

BACKGROUND

Typically, conventional electrical and electronic assembly systems used in a wide range of applications are secured from the environment effects using enclosures made of metals. For example, electronic assemblies in high power applications and those used under harsh environment conditions use metals for structural elements. Metal components are used due to their desirable mechanical properties, availability, manufacturability, and electrical properties. Accordingly, there is a bias toward the use of metal to make various components.

In the field of vehicle applications such as aircraft, different metals and combinations of metals are in widespread use. The use of metal has the drawback of weight. Metals are relatively heavier than other materials, and so every metallic component adds weight to the system. Any addition in weight has an impact on vehicle efficiency, which is compounded when the vehicle operates in the air. To maintain the desired vehicle performance to handle the vehicle's weight, various capabilities such as those of the powerplant need to be increased when the weight is greater.

Conventionally in an electronic system packaging, if a material other than metal is considered for a component, a number of limitations inhibit its use. Though there are many available non-metal materials that weigh less than metal, they generally do not meet the required mechanical and electrical properties. Since most of the parts in an electronic packaging system require certain characteristics that are provided by metal, limited opportunities have existed for the use on non-metal materials.

Accordingly, it is desirable to provide systems and methods for optimizing the use of non-metals as structural components in electronic packaging component applications. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method of constructing an electronic assembly includes identifying a structural component as a candidate for forming as a combined construction of a metal element and a polymer element. A minimum material thickness required of the metal element for achieving a required electromagnetic shielding property is determined. A minimum area required of the metal element for achieving a required electrical bonding property is determined. A maximum polymer element proportion of the structural component that meets a required structural property and a required thermal property is determined. The structural component is designed with the metal element having the minimum material thickness and the minimum area and with the polymer element having the maximum polymer element proportion. The structural component is manufactured from the polymer element and the metal element to meet the mechanical and electrical properties, and the structural component in the electronic assembly.

In accordance with another exemplary embodiment, an electronic assembly system includes a structural component that has a metal element and a polymer element. The metal element is configured to: exhibit electrical properties required of the structural component, including a required electromagnetic shielding property and a required electric bonding property; exhibit, via a minimum material thickness, the required electromagnetic shielding property; and exhibit, via a minimized area required of the metal element, the required electrical bonding property. The metal and polymer elements together are configured to exhibit mechanical properties required of the structural component, including a required structural property and a required thermal property. The metal element has the minimum material thickness and the minimum area and the polymer element embodies a maximum polymer element proportion of the structural component that delivers both the required structural property and the required thermal property.

In accordance with still another exemplary embodiment, a method of constructing an electronic assembly includes identifying, from a list of parts in the electronic assembly, a structural component as a candidate for forming as a combined construction of a metal element and a polymer element. Electrical properties required of the structural component, including a required electromagnetic shielding property and a required electric bonding property, are identified by analysis. Mechanical properties required of the structural component, including a required structural property and a required thermal property, are identified by analysis. A minimum material thickness required of the metal element for achieving the required electromagnetic shielding property, is determined by calculation. A minimum area required of the metal element for achieving the required electrical bonding property, is determined by calculation. Structural properties for various proportions of the combined metal and polymer elements are evaluated using finite element analysis. A maximum polymer element proportion of the structural component that meets the required structural property, is determined by analysis. Thermal properties for various proportions of the combined metal and polymer elements are evaluated using finite element analysis. A maximum polymer element proportion of the structural component that meets the required thermal property is determined by analysis. The structural component is designed with the metal element having the minimum material thickness and the minimum area and with the polymer element having a lowest of the analyzed maximum polymer element proportions. The structural component is constructed from the polymer element and the metal element to meet the mechanical and electrical properties with a maximum use of a polymer in combination with a metal for weight reduction of the structural component. The structural component is then assembled in the electronic assembly.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
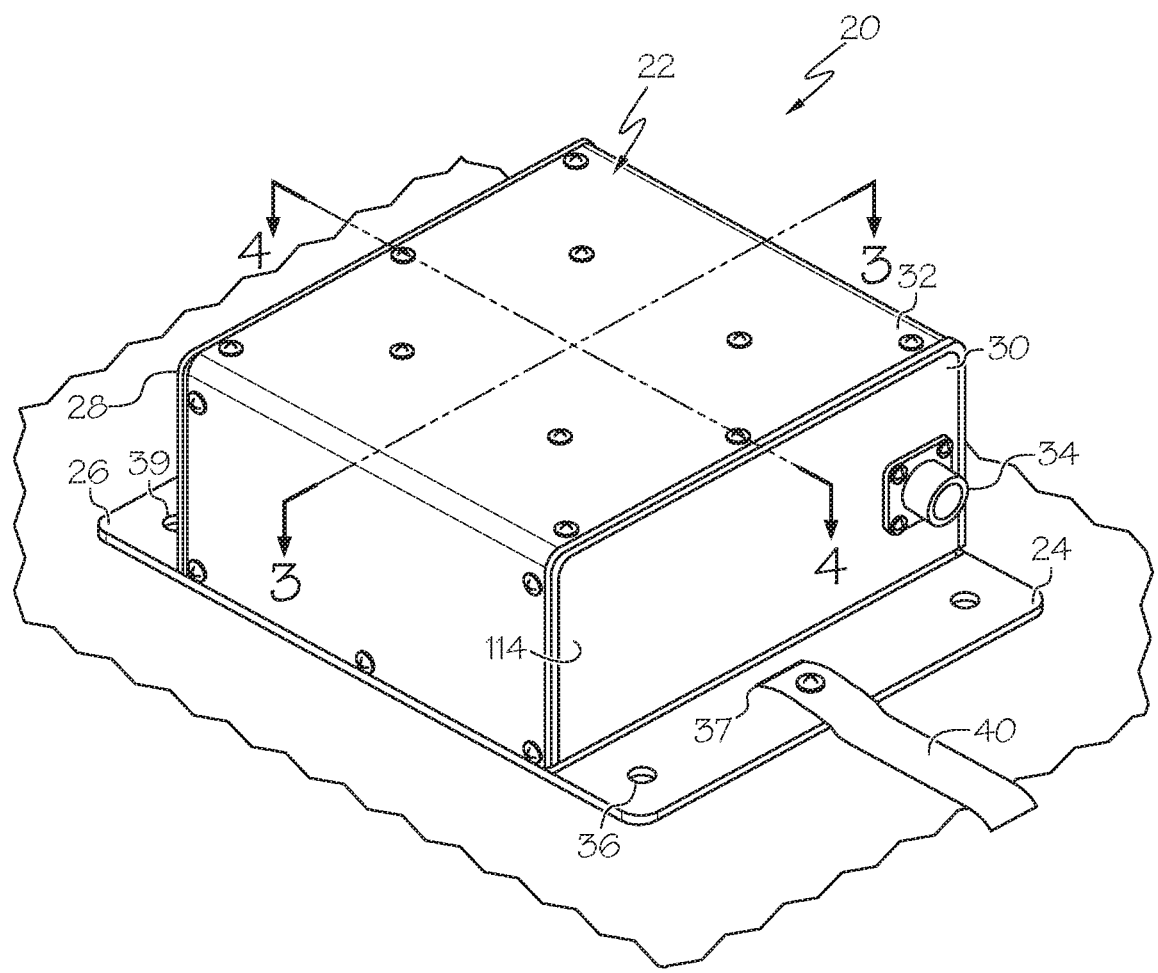
FIG. 1 is a perspective illustration of an electronic assembly system including an electronic unit, according to an exemplary embodiment.

The following detailed description is merely exemplary in nature and is not intended to limit the invention or the applications and uses of the invention. Furthermore, there is no intention to be bound by any theory presented in the preceding background or the following detailed description.

The description contained herein relates to electronic systems and the packaging thereof, and in certain examples is detailed in the context of a manufactured environment, for example, an aircraft. In manufactured environments, various types of systems are electronically controlled to supply different electric power ratings at a variety of voltage and current profiles. These systems may include various forms of electronic control assemblies in which components are assembled via an electronic packaging system. The components include those that carry out electrical/electronic functions, and those that provide structural an electrical properties to support the requirements of the assembly. The features described in the present disclosure optimize the use of polymeric materials along with metallic materials in those structural components that provide various structural and/or electrical properties and are not limited to any particular type electronic assembly, or to any particular application for those assemblies, but rather apply wherever weight reduction is needed. Accordingly, the teachings of the present disclosure may be applied in a variety of applications with electronic assemblies, including with various systems in vehicles such as aircraft, when desired.

Structural components of an electronic system used for electronic packaging purposes require certain electrical bonding and shielding characteristics. Polymer based composites do not generally deliver the required properties. Exemplary embodiments described herein involve the use of polymer based composite materials in place of a portion of a metal part of the component to provide required properties while reducing weight. A number of polymer-based composites may be used as an element of the component in combination with a metallic element. Accordingly, a two-material structural component is used rather than a typical single material metal structural component. In one embodiment, at least one element of the structural component is made of is made of a polymeric element of the structural component such as a polyether ether ketone (PEEK) composite part with carbon fibers. At least one other element of the structural component is made of a metallic material such as aluminum. The size and shape of both elements are derived from shielding thickness requirement calculations, electrical bonding area requirement calculations, and structural and thermal performance by analysis. This results in a structural component of optimized weight meeting needed functional requirements.

An example electronic assembly described herein, includes a number of parts. A structural component among the list of parts is formed as a combined construction of a metal element and a polymer element. The structural component exhibits certain required electrical properties, including a required electromagnetic shielding property and a required electric bonding property. The structural component also exhibits certain mechanical properties, including a required structural property and a required thermal property. The metal element includes a minimum material thickness to achieve the required electromagnetic shielding property, and a minimum area to achieve the required electrical bonding property. Various proportions of the combined metal and polymer elements are evaluated to provide the required structural and thermal properties for the structural component. The structural component has the lesser of a maximum polymer part proportion of the structural component that meets the required structural property or a maximum polymer part proportion of the structural component that meets the required thermal property. The structural component's metal element has the minimum material thickness and the minimum area. The polymer element may be formed by methods such as molding, machining or extrusion. The metal element may be formed by methods such as rolling, stamping, milling, casting or additive manufacturing. The fabricated structural component meets the mechanical and electrical properties with a maximum use of a polymer in combination with a minimum use of the metal for weight reduction and other beneficial properties.

An illustration of an electronic assembly system 20 is shown in FIG. 1, and includes an electronic unit 22 mounted on a surface 24. In the current embodiment, the electronic assembly system 20 is a power supply controller used in a lighting system for powering up aircraft lighting. The electronic assembly system 20 includes electronic and electrical components such as inductors, transformers, capacitors, regulators, transistors, integrated circuits, electrical connectors and others, populated on at least one printed circuit board (PCB). The individual components are secured using mountings on a mechanical enclosure system.

The electronic unit 22 may be electrically bonded directly to the surface 24 and/or may be bonded to other components (not shown) such as other packaging components and electronics components, either of which may be internal or external to the electronic unit 22. Bonding ensures that little or no electrical potential differences arise between the bonded elements and to be effective, requires adequate conductor contact. In various embodiments, this is accomplished through metal-to-metal contact between the bonded components, either directly, or through conductors such as wires, cables, adhesives, fasteners or bars. The electrical bonding joins the metal/conductive components together to form an electrically conductive path, which will conduct any imposed fault current safely. Electrical bonding in aircraft is generally used to: prevent build-up of static electricity which can have undesirable effects such as interfering with radio and navigational equipment; provide lightning protection by allowing the currents induced through lightning strikes to pass through the airframe with minimum arcing; and prevent static discharges in and around aircraft fuel tanks and lines. For example, a bonding resistance of 2.5 milliohms or less across individual faying interfaces within equipment is generally desirable.

The electronic unit 22 and its components include electrical shielding features where a component's material has the capability to: operate as protective shield against external electromagnetic fields; act as barrier preventing internal fields from being radiated outside; and act as a barrier preventing external fields from entering inside the electronic unit 22. Shielding is a property of the material used to make the components and therefore metals, which provide good shielding are typically used for components, and is a function of skin depth and shielding effectiveness formula. A shielding effectiveness of 60-90 dB is generally considered as a high level of protection, while 90-120 dB is generally considered exceptional.

The electronic unit 22 and its components are constructed to withstand the dynamic environment encountered by the electronic assembly system 20 in service, and therefore is made of components that meet the structural requirements necessary to withstand the expected environmental inputs. The electronic unit 22 and its components are also constructed so that all electronic components will operate within their proper design temperature requirements throughout their applicable lifespan, and during exposure to all the applicable environmental conditions.

In general, the electronic unit 22 defines a package with a mechanical enclosure system that includes a base 26, two end brackets 28, 30 and a cover 32. The end bracket 30 includes an electrical connector 34 for coupling the electronic unit 22 with other components via a conductor bundle (not shown). The base 26 is a generally thin, flat sheet with several mounting holes, including mounting holes 36-39. In the current embodiment the base 26 is made of aluminum or an aluminum alloy. The cover is attached to the brackets 28, 30 by a number of fasteners 29, 31, respectively. The mounting holes 36-39 are configured to receive fasteners (not shown) to connect the electronic unit 22 with the surface 24. In addition, at least one mounting hole 37 is adapted as a connection point for a bonding strap 40. The base 26 serves as part of a housing and as a base upon which other components of the electronic unit 22 are mounted. As a metal structural component, the base 22 exhibits good shielding, bonding, thermal and structural properties.

The cover 32 is a generally thin, flat sheet formed into a three sided shape so that the base 26 and cover 32 together define four sides of the packaged space of the electronic unit 22. As an additional metal structural component, the cover 32 exhibits good shielding, bonding, thermal and structural properties. In the current embodiment, due to their small thickness and structural nature, the base 26 and the cover 32 may not benefit substantially by weight reduction from being made of a combination of polymer and metal construction. However, in other embodiments, such as where additional weight reduction is needed or due to their shape, the cover 32 and/or the base 26 may be made of a combination of polymer and metal elements using the processes described herein.

Figure 2:
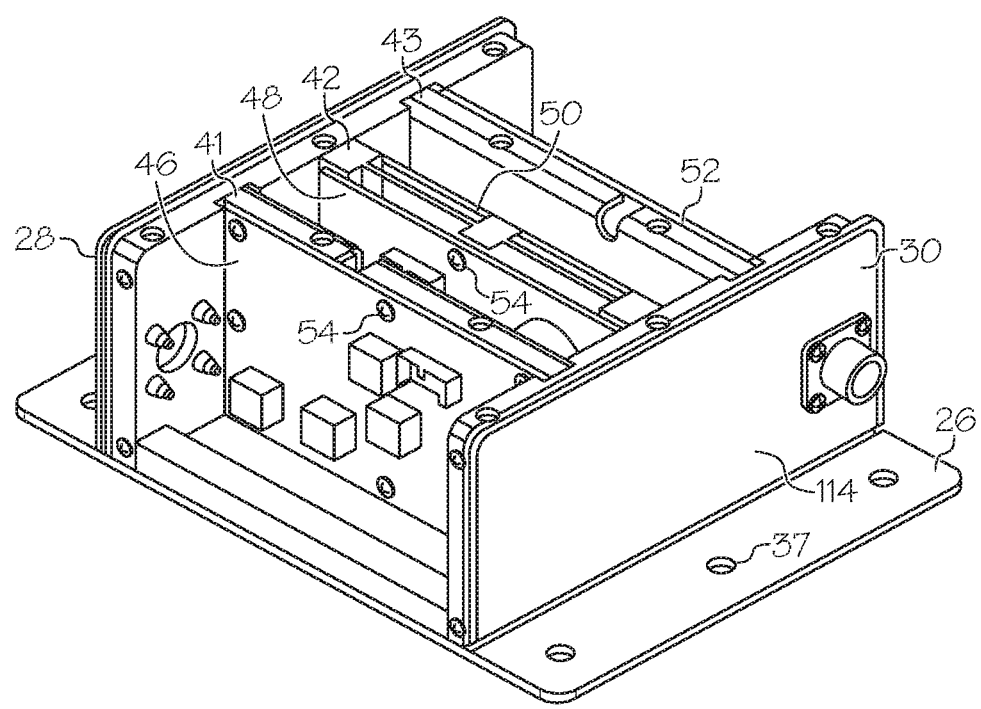
FIG. 2 is a perspective illustration of the electronic unit of FIG. 1 with the cover removed, according to an exemplary embodiment.

Referring to FIG. 2, the electronic unit 22 is shown with the cover 32 (shown in FIG. 1), removed to expose the internal components of the electronic assembly 22. In this embodiment, three brackets 41-43 extend between the end brackets 28, 30 and are in contact therewith. The bracket 41 supports a PCB 46, which in the current embodiment is an input filter PCB assembly. The bracket 42 supports two PCBs 48, 50, which in the current embodiment are power supply PCB assemblies. The bracket 43 supports a PCB 52, which in the current embodiment is an output filter PCB assembly. In each case, the PCBs 46, 48, 50 and 52 are connected with their respective bracket by a number of fasteners 54.

Figure 3:
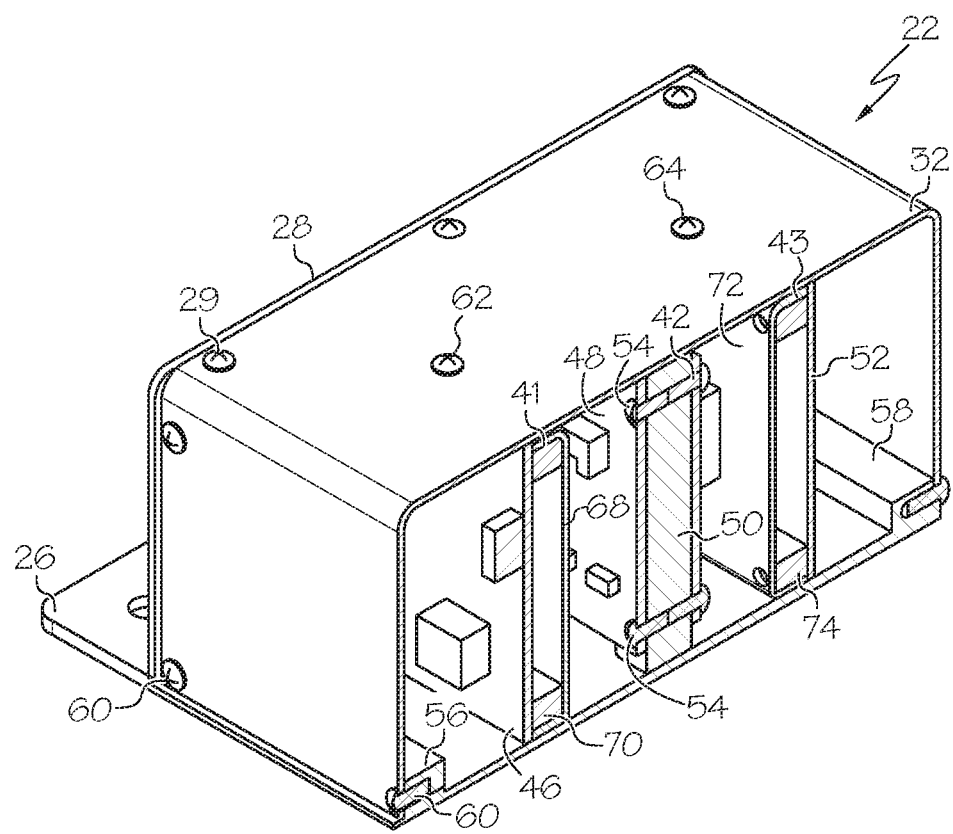
FIG. 3 is a cross sectional illustration of the electronic unit of FIG. 1 taken generally through the line indicated as 3-3, according to an exemplary embodiment.
Figure 4:
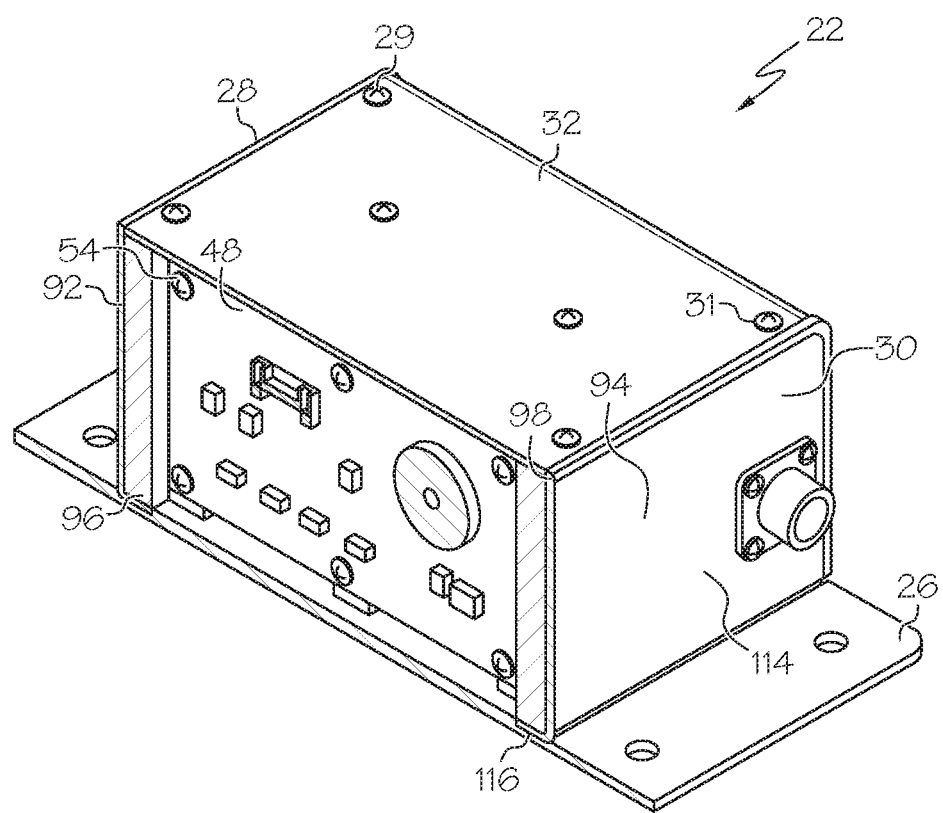
FIG. 4 is a perspective, cross sectional illustration of the electronic unit of FIG. 1 taken generally through the line indicated as 4-4, according to exemplary embodiment.

Referring additionally to FIGS. 3 and 4, cross sections through the electronic unit 22 are shown. The base 26 includes a pair of braces 56, 58 to which the cover 32 is attached by a number of fasteners 60. In this embodiment, the braces 56, 58 are an integral part of the base 26 and therefore, are made of metal. The fasteners 60 are also metal, and the metal cover 32 is in metal-to-metal contact with the base 26. The brackets 41-43 are also connected to the base 26 and to the cover 32 for example, by fasteners 62, 64 respectively, which are made of metal. The bracket 42 is also made of metal, in this embodiment aluminum or an aluminum alloy, which is in metal-to-metal contact with the cover 32 and with the base 26. In other embodiments, such as where additional weight reduction is needed, the bracket 42 may be made of a combination of polymer and metal elements using the processes described herein.

The brackets 41-43 are configured to rigidly secure and house the PCBs 46, 48, 50 and 52 to withstand vibrations, temperature changes and other environmental factors. In addition, the brackets 41-43 are configured to provide structural and thermal heat dissipation requirements, as well as to establish good electrical bonding contact with their next level assembly/mating parts, and to help shield the system from electromagnetic disturbances.

In the current embodiment, the bracket 41 is made of a metal element 68 and a polymer element 70. Similarly, the bracket 43 is made of a metal element 72 and a polymer element 74. The metal elements 68, 72 are made of aluminum or an aluminum alloy in the current embodiment, and are each in direct contact with the cover 32 and with the base 26. The polymer elements 70, 74 are made of a carbon fiber PEEK composite in the current embodiment and therefore have limited conductivity. Some conduction may occur, primarily through the carbon fibers. Specifically, the polymer elements 70, 74 are made of a 30% carbon fiber reinforced PEEK material.

Figure 5:
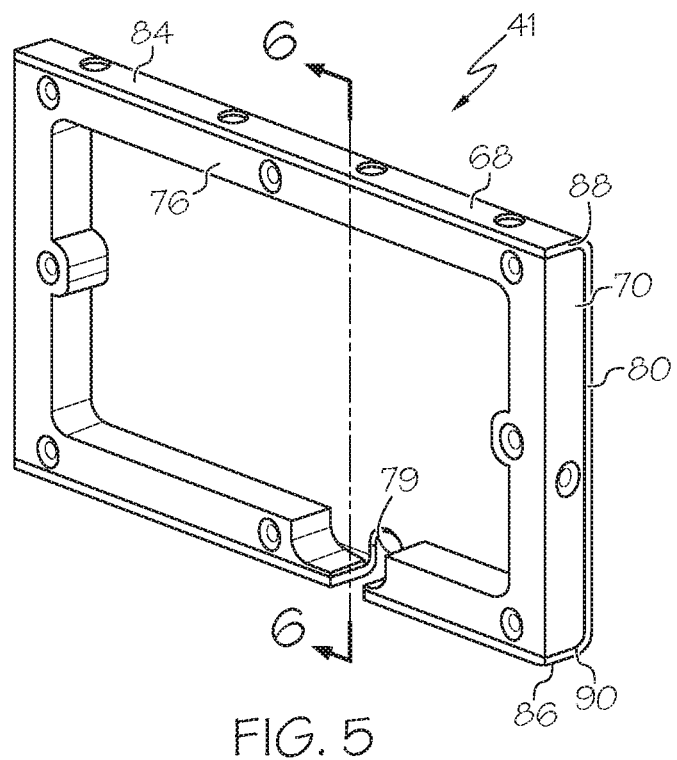
FIG. 5 is a perspective illustration of a bracket of the electronic unit of FIG. 2, according to an exemplary embodiment.
Figure 6:
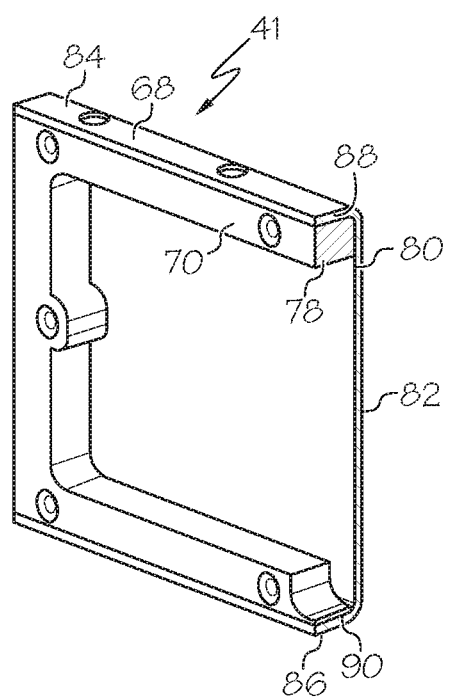
FIG. 6 is a perspective, cross-sectional illustration taken generally through the line indicated as 6-6 in FIG. 5, according to an exemplary embodiment.
Figure 7:
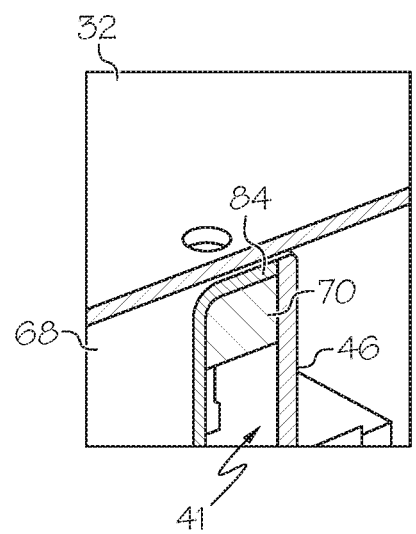
FIG. 7 is a fragmentary, cross-sectional illustration of a portion of the electronic unit of FIG. 2, according to an exemplary embodiment.

Referring additionally to FIGS. 5 and 6, the bracket 41 is illustrated in greater detail as an example of the brackets 41, 43. The polymer element 70 is formed as a frame that extends around the perimeter of the bracket 41 and has an open center 76. The polymer element 70 generally has a cross section 78 that is substantially consistent around the open center 76, with a gap 79 to provide clearance for a component (not shown) of the electronic unit 22. The metal element 68 is shaped to form-fit to one side 80 of the polymer element 70 and includes a wall 82 that spans across the polymer element 70, including across the open center 76. A pair of walls 84, 86 extend from the wall 82 and are disposed generally ninety-degrees relative thereto. Each of the walls 84, 86 extends across a respective side 88, 90 of the polymer element 70. Accordingly, the metal element 68 extends across, and is in close contact with, the sides 88, 80, 90 of the polymer element 70. The walls 84, 86 extend completely across the sides 88, 90 respectively, so that they are in contact with the PCB 64 as shown in FIG. 3. The wall 84 is also in contact with, and lies flat against, the cover 32 as shown in FIG. 7. The metal element 68 and the polymer element 70 may be united together using a variety of methods. In one embodiment, the metal element 68 is formed and then overmolded in with the polymer element 70. In another embodiment, the metal element 68 and the polymer element 70 have a complementary snap fitting configuration. In another embodiment, the metal element 68 and the polymer element 70 are connected with fasteners (not shown). The metal element 68 and the polymer element 70 arrangement provides a bracket 41 at a reduced weight in comparison to an all-metal bracket.

Figure 8:
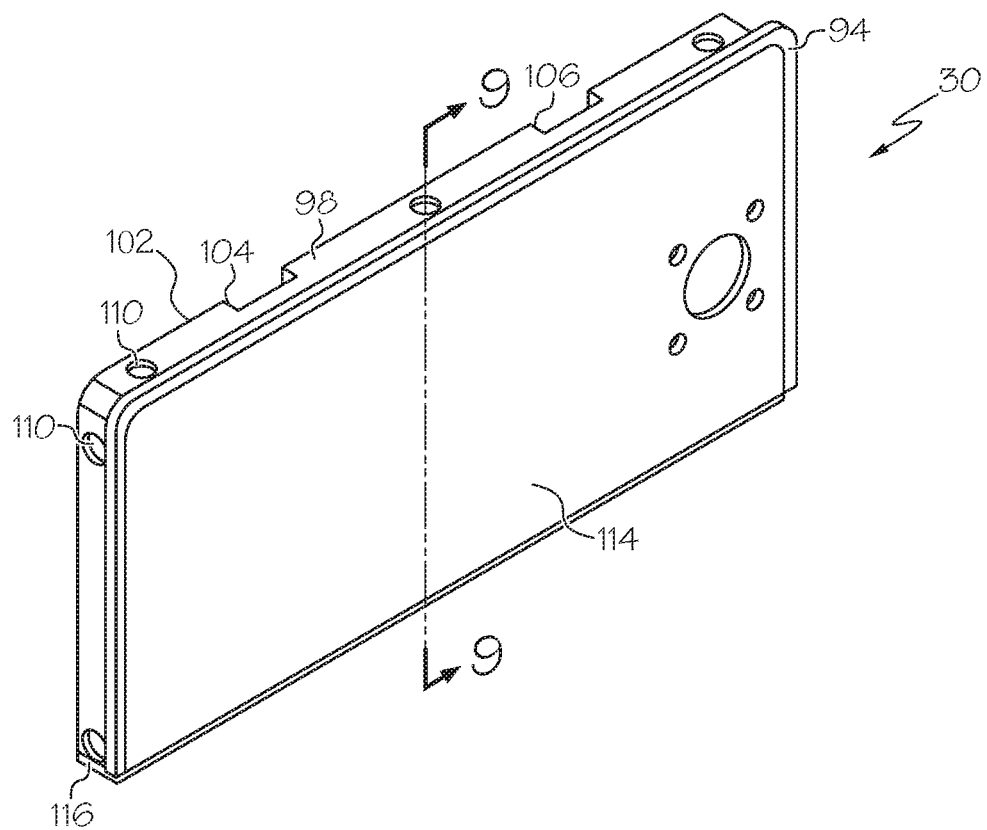
FIG. 8 is a perspective illustration of a bracket of the electronic unit of FIG. 2, according to an exemplary embodiment.
Figure 9:
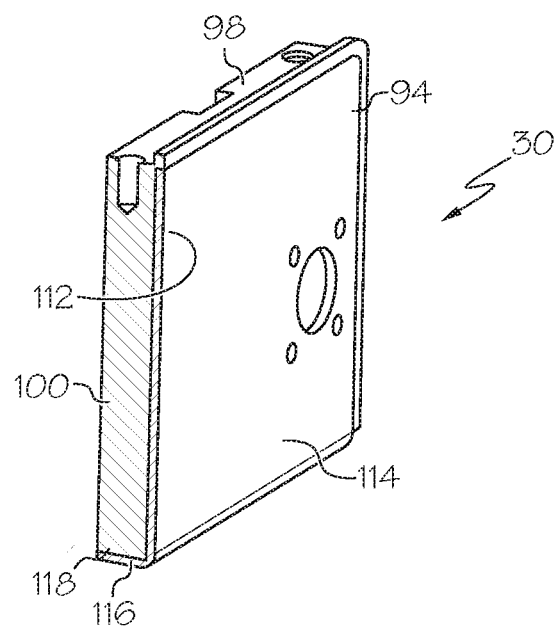
FIG. 9 is a perspective, cross sectional illustration taken generally through the line indicated as 9-9 in FIG. 8, according to an exemplary embodiment.

Also in the current embodiment, the brackets 28, 30 are respectively made of combined metal elements 92, 94 and polymer elements 96, 98 configurations. For example, the bracket 28 includes the metal element 92 and a polymer element 96. Similarly, the bracket 30 includes the metal element 94 and the polymer element 98. The metal elements 92, 94 are made of aluminum or an aluminum alloy in the current embodiment, and are each in direct contact with the cover 32 and with the base 26. The polymer elements 94, 98 are made of a carbon fiber PEEK composite in the current embodiment. Specifically, the polymer elements 94, 98 are made of a 30% carbon fiber reinforced PEEK material. As shown in FIGS. 8 and 9, the bracket 30 is illustrated in greater detail as an example of the brackets 28, 30. The polymer element 98 is formed as a plate that substantially extends across one end of the electronic unit 22 and between the cover 32 and the base 26. The polymer element 98 generally has a cross section 100 that is substantially solid. The inside 102 of the polymer element 98 has a pair of grooves 104, 106 that extend from cover 32 to the base 26. The groove 104 is configured to receive the bracket 41 and the PCB 46. The groove 106 is configured to receive bracket 43 its supported PCB 52. The perimeter 108 of the polymer element 98 includes several holes 110 to receive the fasteners 31 (FIG. 4), for connection with the cover 32.

Figure 10:
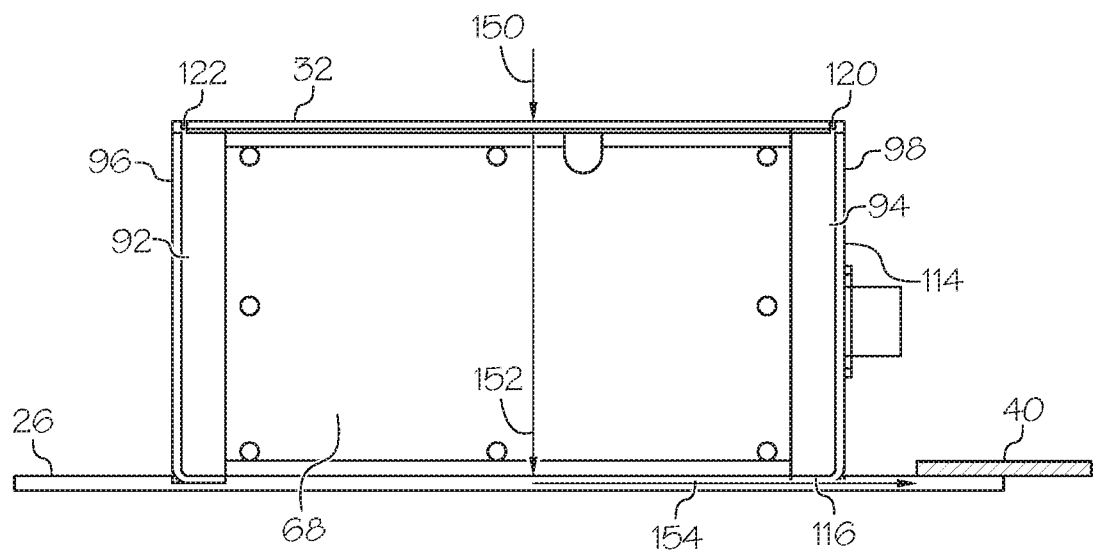
FIG. 10 is a schematic illustration of the electronic unit of FIG. 2 showing a bonding path, according to an exemplary embodiment.

The metal element 94 is shaped to form-fit to one side 112, which in this embodiment is the outside, of the polymer element 98. The metal element 94 is fabricated with a wall 114 that spans across the side 112 of the polymer element 98, and a wall 116, that spans across the side 118 of the polymer element 98. The wall 116 fits closely against the side 118. The wall 116 is integral with the wall 114 and is bent at an angle of approximately ninety-degrees relative thereto. Accordingly, the metal element 94 extends across, and is in close contact with, the sides 112, 118 of the polymer element 94. The wall 116 extends completely across the side 118 and is in contact with, and lies flat against, the base 26 as shown in FIGS. 2 and 4. The wall 114 extends completely across the side 112 but is not in direct contact with the cover 32 as shown in FIG. 10. The cover 32 is sized so that a gap 120 is defined between the cover 32 and the polymer element 98. Similarly, a gap 122 is defined between the cover 32 and the polymer element 96. This gap may be filled with a conductive glue (not shown in figures.) to avoid airgap and increase the bonding and shielding properties. The cover 32 is in direct contact with the base 26 as shown in FIG. 1, and in contact to the polymer elements 96, 98 to by means of conductive glue to increase the bonding and shielding properties of the unit 22. The metal element 94 and the polymer element 98 may be united together using a variety of methods. In one embodiment, the metal element 94 is formed and then molded in along with the polymer element 98. In another embodiment, the metal element 94 and the polymer element 98 have a complementary snap fitting configuration. In another embodiment, the metal element 94 and the polymer element 98 are connected with fasteners (not shown). The combination of the metal element 94 and the polymer element 98 arrangement provides a bracket 30 at a reduced weight in comparison to an all-metal bracket.

Figure 11:
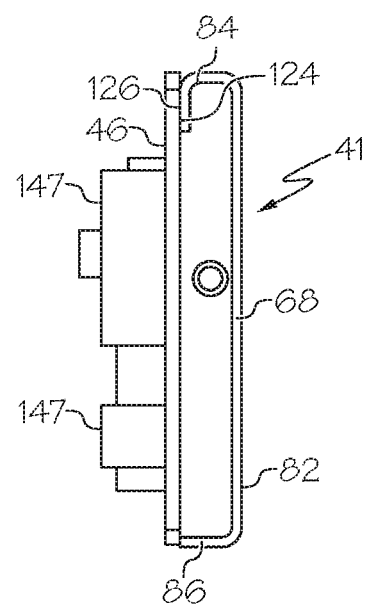
FIG. 11 is a cross sectional illustration of a bracket and printed circuit board sub-assembly of the electronic unit of FIG. 2, according to an exemplary embodiment.

As shown in FIG. 11, in some embodiments the bracket 41 includes a metal element 68 having additional metal contact features with the PCB 46. As in the previously described embodiments, the metal element 68 has contact with the PCB 46 at the end of the wall 86 and at the wall 84. Where additional metal area exposure is needed for thermal and/or electrical bonding requirements, a lip 124 is added to the wall 84 to increase the contact area. The lip 124 extends from the wall 84 and is disposed against the PCB 46 across its surface 126. The surface 126 provides added area of contact to meet the thermal and electrical requirements. Various electronic components 147 are also shown mounted of the PCB 46.

Figure 12:
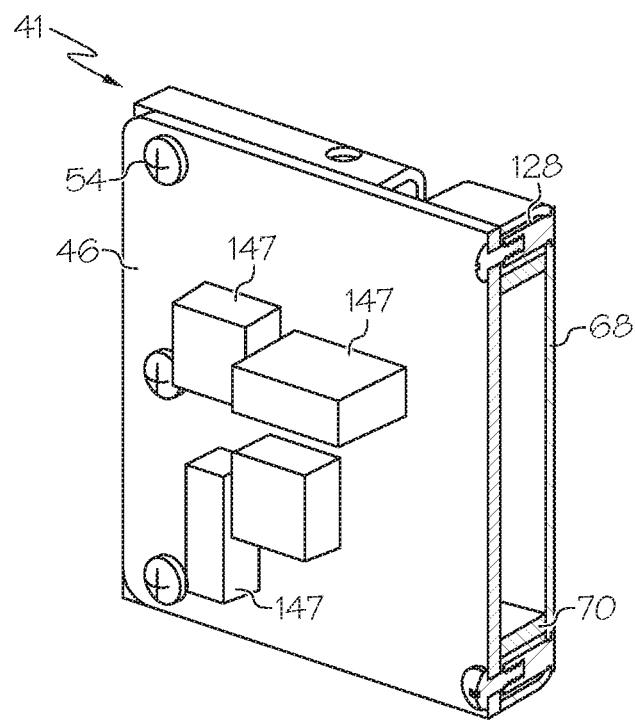
FIG. 12 is a perspective, cross sectional illustration of a bracket and printed circuit board sub-assembly of the electronic unit of FIG. 2, according to an exemplary embodiment.
Figure 13:
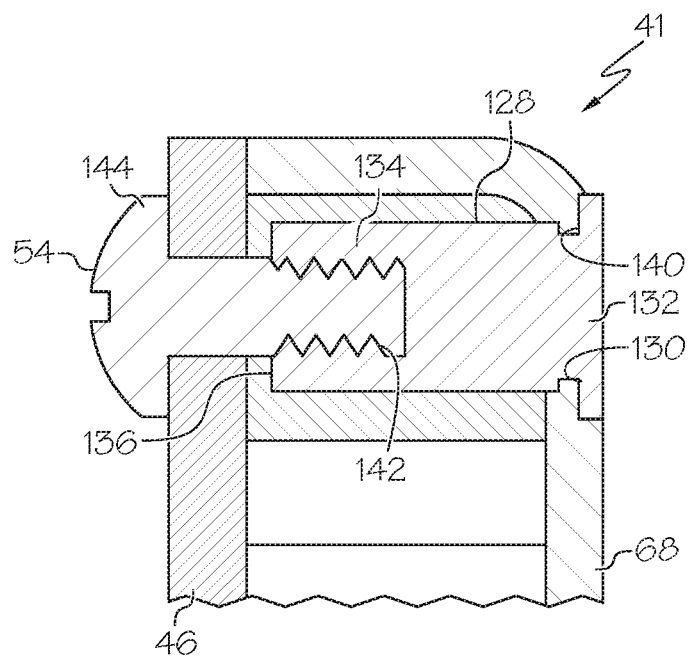
FIG. 13 is a cross sectional illustration of part of the bracket and printed circuit board sub-assembly of FIG. 12, according to an exemplary embodiment.

Referring to FIGS. 12 and 13, in some embodiments, standoffs 128 are used at the fasteners 54 that attach the PCBs 46, 52 to their respective brackets 41, 43. The standoffs 128 and the fasteners 54 are made of metal, such as aluminum or an aluminum alloy. In this embodiment, the bracket 41 includes the metal element 68 and the polymer element 70. The metal element 68 includes a number of openings 130, each of which contains its respective standoff 128. The standoff 128 includes a head 132. A body 134 extends into the bracket 41 from the head 132 and has an end 136 that is spaced from the PCB 46. The head 132 is enlarged in relation to the body 134. A groove 140 is formed in the body 134 adjacent the head 132 and is disposed in the opening 130 to capture the standoff 128 with the bracket 41. A threaded opening 142 is formed through the end 136 and receives the fastener 54. The fastener 54 extends through the PCB 46 and has a head 144 disposed against the PCB 46. The fastener 54 also extends through the polymer element 70. Via the fastener 54, the PCB 46 is clamped against the wall 84 and is also in contact with the metal element 68 through the fastener 54 and the standoff 128, providing additional metal-to-metal contact where needed.

Figure 14A:
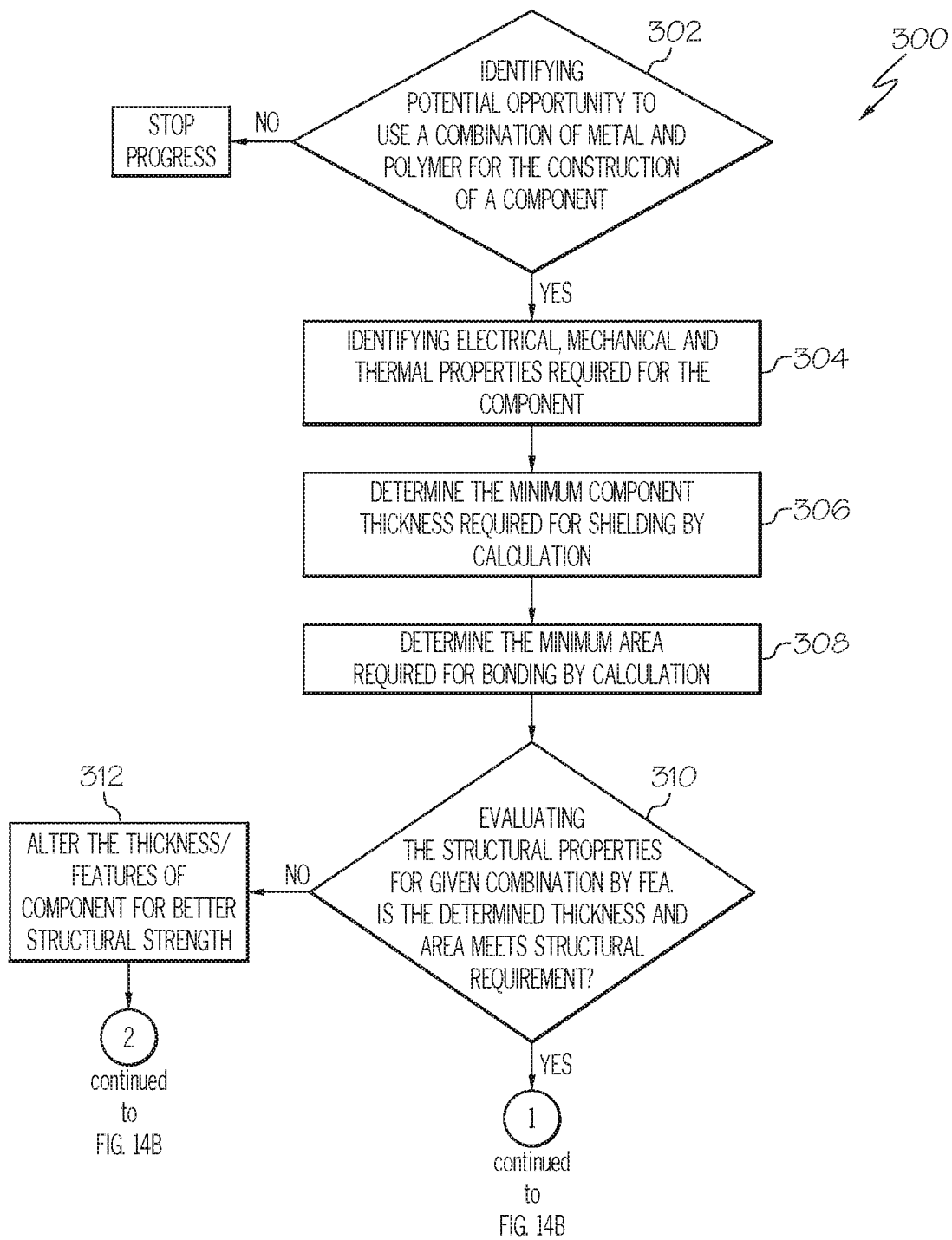
FIGS. 14A and 14B illustrate a process for making the electronic unit of FIG. 2, according to an exemplary embodiment.
Figure 14B:
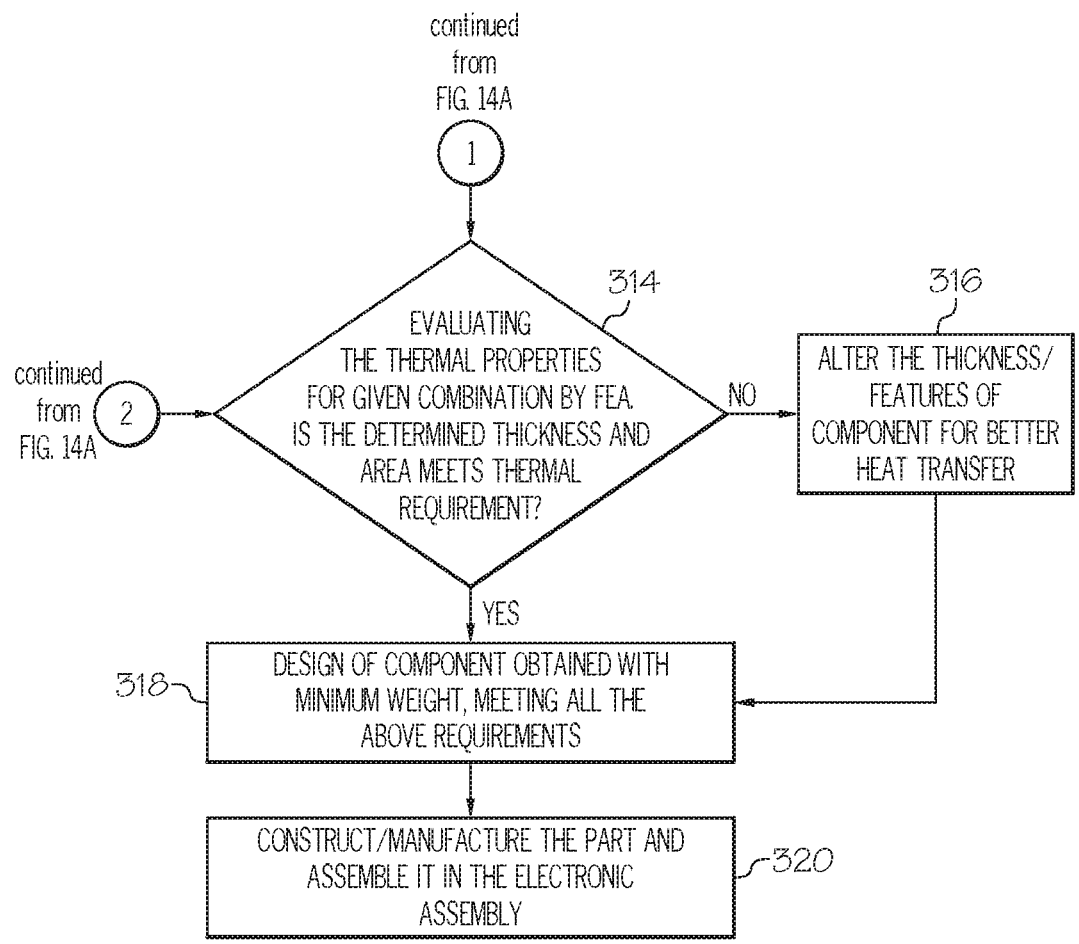

As shown in FIGS. 14A and 14B, a process 300 for determining the design of a structural component with a combination of a metal element and a polymer element evaluates various factors such as the features, size and shape of the combination. In general, an evaluation is made of: the minimum material thickness required for electromagnetic shielding; the minimum area required for electrical bonding; and the structural and thermal characteristics of the selected metal and polymer elements, such as by using calculations and finite element analysis. At step 302, potential opportunities to use a combination of metal and polymer elements for the construction of a structural component are identified. For example, with the electronic unit 22 of FIGS. 1 and 2, the base 26, the cover 32 and the brackets 41-43 may be evaluated. At step 304, the electrical, mechanical and thermal properties required for the structural components are determined. The base 26, is preferred as an all-aluminum part to meet its electrical grounding and bonding requirements. The brackets 41-43 and the cover 32 may be further analyzed.

At step 306, the minimum material metal thickness required for the necessary shielding is determined. Shielding effectiveness shows the capability of a material to operate as a protective shield against external electromagnetic fields and act as barrier preventing internal fields from being radiated outside and as a barrier preventing external fields from entering inside. A skin depth and shielding effectiveness formula may be used. Shielding effectiveness of 60 dB to 90 dB will be considered as high level of protection, while 90 to 120 dB will be considered exceptional. The minimum frequency that the electronic assembly system 20 is subjected to is given as 150 kHz. Calculations are carried out to evaluate the minimum material thickness required to meet shielding effectiveness. The following approach demonstrates the formulas and methods used to calculate the shielding effectiveness with aluminum components where:

Conductivity of Aluminum (Al) is:

$$\frac{1}{2.7*10^{-8}} * \frac{1}{\Omega*m};$$

Minimum frequency is: f=150 KHz;
Magnetic permeability of free space is:

$$\mu_o = 4\pi*10^{-7}\frac{H}{m};$$

Relative magnetic permeability is: $\mu_r=1$;
Magnetic permeability is:

$$\mu = \mu_o*\mu_r = (1.257*10^{-6})\frac{H}{m};$$

and
Skin depth is:

$$\delta_{Al} = \frac{1}{\sqrt{\pi f \mu \sigma_{Al}}} = 2.135*10^{-4} \text{ m} = 0.008 \text{ in.}$$

Attenuation increases with increased skin depth/material thickness (t). The single skin depth will attenuate signals to 37%. Four times the skin depth will attenuate signals to 0.5%. The amount of radiation beyond the shield is preferred to be less than 1%, so a thickness of four times skin depth is further evaluated. Four times $\delta_{A1}$ is $8.541*10^{-4}$ m, which is equal to 0.034In. Absorption loss through shielding/shielding effectiveness for a thickness t=0.0016 m, is given by:

$$20\log_{10}\frac{H_x}{H_{tx}} = 20\log\left(\exp\frac{t}{\delta_{Al}}\right),$$

$$10 = 20\log\left(\exp\frac{0.0016 \text{ m}}{8.541*10^{-4} \text{ m}}\right), 10 = 65.085 \text{ dB};$$

where: $H_x$ is incident field strength; and
$H_{tx}$ is attenuated field strength.

Based on the above calculation, if aluminum is used as a shielding material the minimum wall thickness required for effective shielding is 0.034 inch. The thinnest part in the electronic unit 22 is the cover 32, which has a material thickness of 0.063 inch. An all-aluminum electronic assembly system 20 gives a shielding effectiveness of 65.08 dB. Anything greater than 60 dB is considered as good shielding, so the thickness of the cover 32 when aluminum, is acceptable. Using the above calculations to determine the shielding effectiveness for a case where the electronic unit 22 has the cover 32 and the brackets 41 and 43 made of a combination of metal and polymer elements and the base 26 and brackets 28, 30, 42 made of aluminum, assuming the polymer elements do not contribute to shielding, leads to a shielding effectiveness of 3.38 dB, which is below 60 dB, and is therefore not acceptable. Accordingly, the cover 32 should be all-aluminum and is not a further candidate for weight reduction through the use of a polymer element.

Using the above calculations to determine the shielding effectiveness, a case where the electronic unit 22 is made with the brackets 28, 30 and the brackets 41 and 43 made of a combination of metal and polymer elements, and the base 26, cover 32 and bracket 42 made of all-aluminum, can be evaluated. Assuming the polymer elements do not contribute to shielding, the calculations indicate a shielding effectiveness of 65.09 dB, which is above 60 dB, and is therefore acceptable. Accordingly, the brackets 28, 30, 41 and 43 may be made of a combination of metal and polymer elements to assemble the electronic unit 22 and will have sufficient shielding to meet the application's requirements.

At step 308, The minimum area required for bonding requirements is determined. Electrical bonding involves the process of joining of metal parts (or electrical conductors) together to form an electrically conductive path, to conduct any likely fault current imposed on the system safely. Electrical bonding in aircraft may: prevent a build-up of static electricity which can interfere with radio and navigational equipment; provide lightning protection by allowing the currents induced through lightning striking to pass through the airframe with minimum arcing; and prevent static discharges such as in aircraft fuel tanks and hoses. A bonding resistance of 2.5 milliohms or less across individual faying interfaces within the equipment is generally preferred. Volume resistivity or specific electrical resistance of aluminum is $2.82*10^{-8}$ Ωm, and of PEEK composite (30% carbon filled), is 1000 Ωm. To calculate the electrical resistance the following formula may be used:

$$R = \rho\frac{l}{A};$$

where:
R is electrical resistance;
$\rho$ is specific electrical resistance of material;
l is length of the conductor; and
A is cross sectional area of the conductor.

From the above formula, it can be inferred that electrical resistance of the component or a system is depended on $\rho$, l and A. In case of a constant/and A, the electrical resistance of the component will vary due to different ρ values of different materials considered, which indicates that resistance R value is directly related to change in ρ. For components with a complex shape or features, the component models may be simplified to a closest representation. As in the previous step, the cover 32, bracket 42, and base 26 being made of aluminum is assumed, while the brackets 28, 30, 41 and 43 are made of aluminum and PEEK composite molded together. As in FIG. 10 the assumed bonding resistance path to ground 148 for a faulty charge build up is assumed. The path to ground 148 is made of three resistance paths: path 150 (R1) through the cover 32; path 152 (R2) through the bracket 41; and path 154 (R3) through the base 26 to the bonding strap 40.

It is given that the specific electrical resistance of aluminum ($\rho_{A1}$) is $2.82*10^{-8}$ Ωm, and the specific electrical resistance of carbon fiber reinforced PEEK ($\rho_p$) is 1000 Ωm. With the high relative resistance of PEEK, it is safe to assume the metal parts solely serve as the conductor. Accordingly, the length of the conductor ($l_1$), which is the thickness of the cover 32, is 0.002 meter. The cross sectional area of the conductor ($A_1$) is 0.019 square meters. Accordingly, the electrical resistance $R_1$ is $\rho A_1/A_1$, or $2.415*10^{-9}$ Ω. The length of the conductor $l_2$, which is the height of the metal element 68, is 0.072 meter. The cross sectional area of the conductor ($A_2$) is $0.1.951*10^{-4}$ square meters. Accordingly, the electrical resistance $R_2$ is $\rho_{A1} l_2/A_2$, or $1.035*10^{-5}$ Ω. The length of the conductor ($l_3$), which, on average, is the distance from the center 156 of the bracket 41 through the base 26 to the bonding strap 40 is 0.152 meter. The cross sectional area of the conductor ($A_3$) is $1.951*10^{-4}$ square meters. Accordingly, the electrical resistance $R_3$ is $\rho_{A1} l_3/A_3$, or $9.252*10^{-6}$ Ω. The total resistance is $R_1+R_2+R_3$ is $1.961*10^{-2}$ Ω. A similar calculation for the bracket 41 made entirely of aluminum results in a total bonding resistance of 0.022 mΩ. The embodiment with the bracket 41 made of the metal element 68 and the polymer element 70 and its total bonding resistance of 0.01961 mΩ is similar to the bracket 41 made entirely of aluminum, and is well within the bonding resistance requirement of 2.5 mΩ. Accordingly, the bracket 41 made of the metal element 68 and the polymer element 70, with the dimensions given above is acceptable. In various embodiments, the calculation will be carried out for various cross sections/lengths of the metal element 68 to minimize its size, while still meeting the bonding requirement.

At step 310, structural properties are evaluated for different combinations/dimensions of the metal element 68 and the polymer element 70, as an example of the process for evaluating a a structural component. Determinations are made as to whether the thickness and area of the elements 68, 70 meet the structural requirements such as by using finite element analysis. The structural analysis is undertaken to determine whether the bracket 41 of a given configuration will withstand the dynamic environment encountered by the electronic assembly system 20 in service. A random vibration analysis is conducted, such as by using a commercially available structural analysis software tool, to evaluate the stresses of the structural parts and compare to their allowable stresses under multiple design scenarios. Table 1 shows the random vibration analysis stress summary results for a scenario where the cover 32 and the base 26 are made of metal, specifically aluminum, while the brackets 28, 30, 41, 43 are made of polymer, specifically 30% carbon PEEK composite. Table 1 demonstrates that the case is acceptable, because the actual stresses in x, y and z dimensions are below the allowable stress. In various embodiments, the analysis will be carried out for various proportions of the metal element 68 to minimize its size, while still meeting the structural requirement. Where the analysis shows that the actual stresses exceed (within a margin of safety), the allowable stress, the process 300 proceeds to step 312 where the thickness or other features of the structural component are increased/modified for greater structural strength. When adequate structural strength is achieved, the process 300 proceeds to step 314.

TABLE 1

| Component | Material | Allowable Stress (MPa) | Actual Stress x | Actual Stress y | Actual Stress z |
|---|---|---|---|---|---|
| Base 26 | Al6061 T6 | 241.3 | 84.00 | 183.90 | 156.40 |
| Cover 32 | Al6061 T6 | 241.3 | 11.70 | 29.80 | 23.50 |
| Bracket | Al6061 T6 + PEEK Composite (30% Carbon Filled) | 219.9 | 8.16 | 26.00 | 17.80 |
| Bracket | Al6061 T6 + PEEK Composite (30% Carbon Filled) | 219.9 | 24.30 | 85.60 | 72.70 |
| Bracket | Al6061 T6 + PEEK Composite (30% Carbon Filled) | 219.9 | 37.10 | 74.10 | 65.90 |
| Bracket | Al6061 T6 + PEEK Composite (30% Carbon Filled) | 219.9 | 40.40 | 74.70 | 90.70 |

At step 314, thermal properties are evaluated for different combinations/dimensions of the metal element 68 and the polymer element 70 as an example of the process for a structural component. Determinations are made as to whether the thickness and area of the elements 68, 70 meet the thermal requirements such as by using finite element analysis. A steady state thermal analysis is conducted to determine whether all included electronic components will operate within their proper design temperature requirements throughout the life and during exposure to all the applicable environmental conditions. The analysis considers the various electronic components on the PCBs 46, 48, 50 and 52 and their placement thereon. For example, the various electronic and electrical components may include inductors, transformers, capacitors, regulators, transistors, IC's, electrical connectors, and others, each populated on its respective PCB 46, 48, 50, 52, and each secured firmly and electrically grounded for heat transfer through the mounting structural components of the electronic unit 22.

For each electronic and electrical components, its maximum rated operating temperature is considered, using a derated temperature where appropriate. The maximum junction temperatures for each component are considered under various construction scenarios and evaluated against the maximum rated operating temperatures. Where the maximum temperature is exceeded, the process 300 proceeds to step 316 where the thickness or other features of the component are increased/modified for greater heat transfer away from the electrical and electronic components. When adequate peak temperatures are achieved, the process 300 proceeds to step 318. In this example, the simulation for thermal requirements for a scenario where the cover 32 and the base 26 are made of metal, specifically aluminum, and the brackets 28, 30, 41, 43 are made of polymer, specifically 30% carbon PEEK composite in combination with a metal (aluminum), shows temperatures are within the limits of maximum allowed junction temperature and maximum allowed de-rated temperature.

The above analysis through this stage of the process 300 demonstrates that partially and effectively using a polymer material wherever possible, is feasible and provides a significant weight reduction solution, meeting all the specified functional and environmental requirements for an electronic packaging system. At step 318, the electronic unit 22 and its components are designed using the analysis results to reduce weight and deliver the requirements. At step 320, the electronic unit 22 is constructed according to the design from step 318, with the individual components manufactured and assembled in the electronic assembly system 20. In the current embodiment, the cover 32 and the base 26 are made of metal, while the brackets 28, 30, 41, 43 are made of polymer/metal combination. For example, with the bracket 30, the metal element 94 is made of aluminum or an aluminum alloy, and the polymer element 98 is made of 30% carbon PEEK composite. In other embodiments, other metals and other polymers/polymer based composites are used. Features such as size and shape of the metal elements and polymer elements are varied during the product development phase using the relevant material properties to meet different design and manufacturing requirements. The structural components such as the base 26, the cover 32 and the brackets 28, 30, 41, 42, 43 are connected together using metal fasteners 29, 31, 60, 62, 64, and the PCBs 41-43 are connected to their respective structural components using metal fasteners 54 to provide a continuous metallic path through these parts of the electronic assembly 22.

Accordingly, exemplary embodiments discussed herein provide an optimized use of a polymer material in combination with a metal material for electronic packaging components. The use of a combined construction of a metal element and a polymer element increases the opportunities to replace all metal components of an electronic packaging system with a polymer composite and metal combination and maximizes weight saving opportunities. The combined construction of metal and polymer elements meets the structural, thermal, electrical bonding and shielding requirements of the component.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of constructing an electronic assembly, the method comprising:
    identifying, from a list of parts in the electronic assembly, a structural component as a candidate for forming as a combined construction of a metal element and a polymer element;
    determining, by calculation, a minimum material thickness required of the metal element for achieving a required electromagnetic shielding property;
    determining, by calculation, a minimum area required of the metal element for achieving a required electrical bonding property;
    determining, by analysis, a first maximum polymer element proportion of the structural component that meets a required structural property;
    determining, by analysis, a second maximum polymer element proportion of the structural component that meets a required thermal property;
    designing the structural component with the metal element having the minimum material thickness and the minimum area and with the polymer element having a lowest of the first maximum polymer element proportion and the second maximum polymer element proportion;
    manufacturing the structural component from the polymer element and the metal element to meet the mechanical and electrical properties; and
    assembling the structural component in the electronic assembly.

2. The method of claim 1, wherein manufacturing the structural component comprises overmolding the polymer element onto the metal element.

3. The method of claim 1, comprising fastening a printed circuit board having a number of electronic components to the structural component.

4. The method of claim 3, comprising connecting the printed circuit board to the structural component using fasteners made of metal.

5. The method of claim 1, wherein the structural component comprises a bracket and comprising:
    fastening a printed circuit board to the bracket;
    fastening the bracket to a base made of metal; and
    fastening a cover to the bracket and to the base.

6. The method of claim 5, wherein fastening the printed circuit board to the bracket comprises:
    forming an opening in the metal element of the bracket;
    positioning a standoff that is made of metal in the opening, wherein the standoff extends into the polymer element and has an end spaced away from the printed circuit board; and
    connecting a fastener made of metal through the printed circuit board and into the standoff so that the printed circuit board is in metal-to-metal contact with the metal element through the fastener and the standoff.

7. The method of claim 1, comprising: forming the metal element to form-fit to a first side of the polymer element with a wall that spans across a second side of the polymer element; and positioning the wall against a base of the electronic assembly.

8. The method of claim 1, comprising:
    evaluating, using finite element analysis, various structural properties for various proportions of the combined metal and polymer elements; and
    evaluating, using finite element analysis, various thermal properties for various proportions of the combined metal and polymer elements.

9. The method of claim 1, comprising:
forming the metal element of aluminum; and
forming the polymer element of a composite material of polyether ether ketone with thirty-percent carbon fibers.

10. The method of claim 1, wherein the electronic assembly comprises a base and a cover and comprising:
fabricating the base and the cover of a metal material;
fastening a printed circuit board to the metal element of the structural component with a first metal fastener;
fastening the structural component to the base with a second metal fastener so that the metal element contacts the base; and
fastening the cover to the base and to the structural component.

11. The method of claim 10, comprising defining a space between the cover and the metal element with the cover is fastened to the polymer element.

12. The method of claim 1, comprising effecting added bonding between the structural component and a base to which the structural component is mounted by forming a wall of the metal element that lies flat against the base.

13. A method of constructing an electronic assembly, the method comprising:
identifying, from a list of parts in the electronic assembly, a structural component as a candidate for forming as a combined construction of a metal element and a polymer element;
identifying, by analysis, electrical properties required of the structural component, including a required electromagnetic shielding property and a required electric bonding property;
identifying, by analysis, mechanical properties required of the structural component, including a required structural property and a required thermal property;
determining, by calculation, a minimum material thickness required of the metal element for achieving the required electromagnetic shielding property;
determining, by calculation, a minimum area required of the metal element for achieving the required electrical bonding property;
evaluating, using finite element analysis, structural properties for various proportions of the combined metal and polymer elements;
determining, by analysis, a first maximum polymer element proportion of the structural component that meets the required structural property;
evaluating, using finite element analysis, thermal properties for various proportions of the combined metal and polymer elements;
determining, by analysis, a second maximum polymer element proportion of the structural component that meets the required thermal property;
designing the structural component with the metal element having the minimum material thickness and the minimum area and with the polymer element having a lowest of the first maximum polymer element proportion and the second maximum polymer element proportion;
constructing the structural component from the polymer element and the metal element to meet the mechanical and electrical properties with a maximum use of a polymer in combination with a metal for weight reduction of the structural component; and
assembling the structural component in the electronic assembly.

14. A method of constructing an electronic assembly, the method comprising:
providing a structural component having a first element comprising a metallic material and a second element comprising a polymeric material;
determining electrical properties required of the structural component, including a required electromagnetic shielding property and a required electric bonding property;
determining a minimum material thickness to provide the required electromagnetic shielding property;
determining, via an area required of the first element, the required electrical bonding property, wherein the area is minimized while providing the required electrical bonding property;
determining mechanical properties required of the structural component, including a required structural property and a required thermal property;
determining the required structural property and the required thermal property; and
manufacturing the structural component from the first element and the second element, wherein the first element has the minimum material thickness and the minimum area and the second element has a lowest of a first maximum polymer element proportion and a second maximum polymer element proportion, wherein the first maximum polymer element proportion of the structural component is a first maximum proportion of the second element relative to the first element that delivers the required structural property and the second maximum polymer element proportion of the structural component is a second maximum proportion of the second element relative to the first element that delivers the required thermal property.

15. The method of claim 14, comprising providing a printed circuit board having a number of electronic components; and fastening the printed circuit board to the structural component.

16. The method of claim 14, wherein the structural component comprises a bracket and comprising:
fastening a printed circuit board to the bracket;
fastening a base comprising a metal material to the bracket; and
fastening a cover comprising a metal material to the bracket and to the base.

17. The method of claim 16, wherein the metal element defines an opening and comprising:
connecting a standoff in the opening, wherein the standoff extends into the polymer element and has an end spaced away from the printed circuit board; and
connecting a fastener through the printed circuit board and to the standoff so that the printed circuit board is in metal-to-metal contact with the metal element through the fastener and the standoff, each of which comprises a metal material.

18. The method of claim 16, comprising form-fitting the metal element to a first side of the polymer element and comprises a wall that spans across a second side of the polymer element; and positioning the wall against a base of the electronic assembly.

19. The method of claim 18, comprising defining a space is between the cover and the metal element and fastening the cover to the polymer element.

20. The method of claim 14, wherein the polymer element comprises a frame that extends around a perimeter of the component and has an open center, and comprising form-fitting the metal element to one side of the polymer element;

providing a first wall that spans across the polymer element, including across the open center, and providing second and third walls that extend from the first wall and each of which extends across a respective opposed side of the polymer element.

* * * * *